United States Patent
Angerhofer et al.

(10) Patent No.: US 11,951,584 B2
(45) Date of Patent: Apr. 9, 2024

(54) ALIGNMENT DEVICE FOR ADJUSTING A WORKPIECE ON A MACHINE TABLE OF A NUMERICALLY CONTROLLED MACHINE TOOL

(71) Applicant: DECKEL MAHO Pfronten GmbH, Pfronten (DE)

(72) Inventors: Marcus Angerhofer, Bernbeuren (DE); Benjamin Jansen, Unterthingau (DE)

(73) Assignee: DECKEL MAHO Pfronten GmbH, Pfronten (DE)

(*) Notice: Subject to any disclaimer, the term of this patent is extended or adjusted under 35 U.S.C. 154(b) by 448 days.

(21) Appl. No.: 17/257,574

(22) PCT Filed: Aug. 7, 2019

(86) PCT No.: PCT/EP2019/071218
§ 371 (c)(1),
(2) Date: Jan. 2, 2021

(87) PCT Pub. No.: WO2020/030692
PCT Pub. Date: Feb. 13, 2020

(65) Prior Publication Data
US 2021/0283734 A1    Sep. 16, 2021

(30) Foreign Application Priority Data
Aug. 7, 2018  (DE) ............... 10 2018 213 226.7

(51) Int. Cl.
*B23Q 3/18* (2006.01)
*B23Q 1/28* (2006.01)
*B23Q 1/62* (2006.01)

(52) U.S. Cl.
CPC ............ *B23Q 3/186* (2013.01); *B23Q 1/28* (2013.01); *B23Q 1/62* (2013.01); *B23Q 2220/004* (2013.01)

(58) Field of Classification Search
CPC . B23Q 3/186; B23Q 1/28; B23Q 1/62; B23Q 2220/004; B23Q 3/183; B23B 31/36
See application file for complete search history.

(56) References Cited

U.S. PATENT DOCUMENTS 2,524,468 A    10/1950  Ouimette
5,481,944 A    1/1996   Oketani et al.
(Continued)

FOREIGN PATENT DOCUMENTS

DE    2312786 A  *  9/1974  ............. B23B 25/06
DE    2312786 A1    9/1974
(Continued)

OTHER PUBLICATIONS

Ernst Prof Dr Ing Salje; DE-2312786-A Machine Translation (Year: 1974).*

(Continued)

*Primary Examiner* — Lee A Holly
(74) *Attorney, Agent, or Firm* — Henricks Slavin LLP

(57) ABSTRACT

The present invention relates to an alignment device (100) for adjusting a workpiece (400) on a machine table (300) of a numerically controlled machine tool (1000), the alignment device (100) comprises: a lower plate (20) which can be mounted on the machine table (300) of the machine tool (1000), an upper plate (10) which is movably arranged on the lower plate (20), on the upper side of which a workpiece carrier (200) can be mounted, an adjusting mechanism which is arranged between the lower plate (20) and the upper plate (10) for adjusting the relative position of the upper plate (10) to the lower plate (20), and a locking mechanism for securing the relative position of the upper plate (10) to the lower plate (20).

10 Claims, 7 Drawing Sheets

(56) References Cited

U.S. PATENT DOCUMENTS

| | | | | |
|---|---|---|---|---|
| 10,029,314 B1* | 7/2018 | Wu | ............... | B23Q 17/006 |
| 2005/0087919 A1* | 4/2005 | Arai | ............... | B23Q 3/06 |
| | | | | 269/329 |
| 2013/0334753 A1* | 12/2013 | Stanifer | ............... | B23Q 3/069 |
| | | | | 29/559 |

FOREIGN PATENT DOCUMENTS

| | | |
|---|---|---|
| DE | 8535668 U1 | 2/1986 |
| DE | 29622080 U1 | 2/1997 |
| DE | 19902596 A1 | 8/2000 |
| DE | 10 2007 020 633 B4 | 4/2009 |
| DE | 10 2016 104 066 A1 | 9/2017 |
| EP | 0249021 A2 | 12/1987 |
| EP | 1693147 A1 | 8/2006 |
| EP | 2578352 A2 | 4/2013 |

OTHER PUBLICATIONS

International Search Report dated Apr. 20, 2020 for PCT App. Ser. No. PCT/EP2019/071218.
Office Action dated Sep. 22, 2022 for CN App. Ser. No. 201980051327.2, with English translation.
Office Action dated Jul. 4, 2023 for EPO App. Ser. No. 19 752 480.4, with English translation.

* cited by examiner

ALIGNMENT DEVICE FOR ADJUSTING A WORKPIECE ON A MACHINE TABLE OF A NUMERICALLY CONTROLLED MACHINE TOOL

The present invention relates to an alignment device for adjusting a workpiece on a machine table of a numerically controlled machine tool. The present invention also relates to a method for aligning a position of a workpiece on a machine table of a numerically controlled machine tool.

BACKGROUND OF THE INVENTION

Adjusting devices for workpieces in machine tools, as they are known, for example, from DE 10 2007 020 633 B4 or from DE 10 2016 104 066 A1, are used, among other things, for adjustment in case of a runout offset of the workpiece from the axis of rotation of the machine table. The cause for such an offset may be, for example, that the workpiece had to be reclamped and, as a result, the originally set relative position of the workpiece with respect to the machine table was lost.

A positioning device is described in DE 10 2007 020 633 B4, the positioning device having a base body and an output body arranged in front of the base body with respect to a longitudinal axis for connection to a workpiece. Furthermore, the positioning device includes a connecting element connected to the base body and extending along the longitudinal axis and at least two eccentric actuators, in particular eccentric piezo actuators, fastened to the base body and acting transversely to the longitudinal axis, the eccentric actuators being configured to displace the output body with respect to the base body and perpendicularly to the longitudinal axis by elastically deforming the connecting element.

In addition, DE 10 2007 020 633 B4 describes that the positioning device comprises at least two tilt actuators, in particular tilt piezo actuators, for tilting the output body with respect to the base body.

DE 10 2016 104 066 A1 describes an adjusting unit and a method for detecting and correcting the runout error of a workpiece clamped in a chuck, the adjusting unit including a base body that can be coaxially fastened to a machine spindle. On the side of the base body facing away from the machine spindle, a chuck flange is arranged which is formed separately from the base body and has a central receptacle for an axially adjustable centering piece mounted radially displaceably in the base body. A first eccentric disk with a central opening and a second eccentric disk with a central opening are provided, the centering piece being inserted into the central openings. At least one adjusting motor for rotating the first eccentric disk and/or the second eccentric disk is provided. The document also describes a method for detecting and correcting the runout error of a workpiece clamped in a chuck by means of an adjusting unit.

However, the two known adjusting devices have the disadvantage, among others, that the protruding structure thereof creates a considerable distance between the machine table and the workpiece to be machined, since both the mechanics of the eccentric disks and the structure with the piezo actuators take up a lot of space, wherein, with respect to machining accuracy, it would be advantageous if the workpiece to be machined were as close as possible to the machine table.

In addition, DE 10 2007 020 633 B4 shows, among other things, that the load of the workpiece must always be held by the adjustment mechanism such that a fixation of the adjusted position of the workpiece with respect to the machine table is only partially provided and, depending on the position of the center of gravity of the workpiece and the clamping device with respect to the machine table, a change in the originally adjusted position can be caused.

In particular, this is disadvantageous because it can cause machining inaccuracies in the workpiece which only to a limited extent can be detected or measured during machining and usually only become visible after machining has been completed.

SUMMARY OF THE INVENTION

It is therefore an object of the present invention to provide an alignment device for adjusting a workpiece on a machine table of a numerically controlled machine tool while avoiding the above problems.

Another object of the present invention is to provide a method for aligning a position of a workpiece on a machine table of a numerically controlled machine tool.

These objects are achieved by an alignment device according to claim 1 and a method according to claim 15, respectively. The dependent claims relate to advantageous exemplary embodiments of the alignment device according to the invention.

The alignment device for adjusting a workpiece on a machine table of a numerically controlled machine tool according to the invention comprises: a lower plate mountable on the machine table of the machine tool, an upper plate movably arranged on the lower plate, on the upper side of which a workpiece carrier is mountable, an adjustment mechanism formed between the lower plate and the upper plate for adjusting the relative position of the upper plate with respect to the lower plate, and a locking mechanism for securing the relative position of the upper plate with respect to the lower plate.

By using the alignment device according to the invention for adjusting workpieces on the machine table of the machine tool, highly precise clamping means, such as a ring clamping device, are not required. In addition, an adjustment movement of approx. ±0.25 mm from the unadjusted position to the adjusted position is sufficient for the position of the clamped workpiece, depending on the configuration of the adjustment mechanism (e.g., depending on a wedge angle).

Furthermore, using the alignment device according to the invention, a fully automatic alignment process can be performed without the operator of the machine tool having to intervene manually in any way. Thereby, machining the workpiece achieves more constant results, which is also of great importance for the reproducibility of a specific workpiece, of course.

Furthermore, using the alignment device according to the invention allows for tapping in the work space, which is used to control the movement of the workpiece, to become superfluous. In addition, diameters that have to be scanned/tapped can be built over, for example, with clamping claws.

The alignment device according to the invention may also be used for all mechanical clamping means and also offers the advantage that expenses for the alignment device are incurred only once in contrast to the costs for various ring or expanding clamping mandrels in order to cover the entire range of workpieces or components.

In addition, the alignment device according to the invention does not require any hydraulics provided by the machine tool, but could be connected thereto if required.

Among other things, this results in the alignment device according to the invention being usable on all milling/turning machines.

The alignment device according to the invention is also particularly advantageous in that fine adjustments for eccentric turning are possible therewith.

A particularly advantageous development of the alignment device according to the invention is that the adjustment mechanism between the lower plate and the upper plate is configured such that, by introducing a mechanical force, wedge-shaped elements are displaced with respect to one another in such a way that the upper plate is displaced with respect to the lower plate and substantially in parallel to a plane of the machine table on which the lower plate is mounted.

A particularly advantageous development of the alignment device according to the invention is that the adjustment mechanism is further configured such that two opposing pairs of wedge-shaped elements displace the upper plate in a direction with respect to the lower plate, the upper plate being displaceable in two mutually perpendicular directions with respect to the lower plate.

By using wedge-shaped elements to adjust the relative position of the workpiece with respect to the machine table, adjustments can be carried out in a simple manner with high accuracy. In addition, wedge-shaped elements, depending on their wedge angle, ensure that the set relative position of the workpiece with respect to the machine table is secured due to their function as self-locking gear.

In addition, by using the wedge-shaped elements, the force applied to displace the wedge-shaped elements can be significantly increased, depending on the wedge angle, so that a very high displacement force for adjusting the workpiece with respect to the machine table can be generated.

A further advantageous development of the alignment device according to the invention results from the adjustment mechanism being configured such that one wedge-shaped element of each pair can be displaced with respect to the other wedge-shaped element of the respective pair, wherein the displaceable wedge-shaped elements jointly causing the displacement of the upper plate in a direction are coupled to one another by means of a lever mechanism.

This is particularly advantageous for allowing any mechanical play that may exist between the wedge-shaped elements that act in an adjustment direction of the upper plate of the alignment device to be eliminated and thus a very precise setting/adjustment of the workpiece with respect to the machine table.

In addition, an advantageous development of the alignment device according to the invention is that the lever mechanism is configured such that the displaceable wedge-shaped elements, which together cause the displacement of the upper plate in a direction, have at their respective ends in the displacement direction thereof a common lever element, which rotatably mounted in one of the pairs of wedge-shaped elements causing the displacement of the upper plate in the direction perpendicular thereto. Thereby, a displacement movement of the one displaceable wedge-shaped element can be transmitted to the other displaceable wedge-shaped element for the displacement of the upper plate in a direction.

Advantageously, this makes it possible to move only one of the wedge-shaped elements, which acts in an adjustment direction of the upper plate of the alignment device, for example by means of a spindle, so that the lever elements can transmit the movement of the one wedge-shaped element to the other wedge-shaped element acting in the same adjustment direction.

In addition, an advantageous development of the alignment device according to the invention may be that the interaction of the lever elements with the corresponding displaceable wedge-shaped elements, which cause a displacement of the upper plate in a direction, can be set in a manner free of play by means of an adjustment device (such as ground adjustment disks).

A further advantageous development of the alignment device according to the invention is that the alignment device further includes: two spindles for introducing a mechanical force for displacing the upper plate with respect to the lower plate, wherein a first spindle of the two spindles is provided for a first displacement direction of the upper plate and a second spindle of the two spindles is provided for a second displacement direction perpendicular to the first displacement direction.

In this way, a displacement direction/adjustment direction of the upper plate with respect to the lower plate of the alignment device can advantageously be operated with each spindle.

In addition, the alignment device according to the invention may advantageously be further developed in that each of the two spindles includes, on the side opposite the wedge-shaped elements, an engagement portion on which the displacement of the upper plate with respect to the lower plate can be effected by rotating the engagement portion.

The engagement portions advantageously allow for tools of the most varied types to be brought into engagement with the spindles either automatically or, if necessary, manually for adjusting the workpiece with respect to the machine table in order to allow for the spindles to be adjusted.

Furthermore, the alignment device according to the invention may be advantageously developed in that the locking mechanism further comprises: hydraulic clamping cylinders which clamp the clamping portions of the alignment device and thereby secure a relative position between the upper plate and the lower plate by means of clamping.

By providing hydraulic clamping cylinders, the adjusted relative position between the workpiece and the machine table can be secured particularly advantageously. In addition, securing by means of clamping relieves the load on the adjustment mechanism during the machining of the workpiece such that no damage from the machining processes or even only slight wear over time is to be expected in the adjustment mechanism.

Furthermore, the alignment device according to the invention may advantageously be further developed in that the alignment device further comprises: a clamping spindle, by means of which a hydraulic pressure in the hydraulic clamping cylinders of the locking mechanism can be generated for securing the relative position of the upper plate with respect to the lower plate, the clamping spindle including, on the side opposite the generation of the hydraulic pressure, an engagement portion on which the hydraulic pressure can be generated by rotating the engagement portion.

As a result, in addition to the spindles for adjusting the workpiece with respect to the machine table, the clamping may also be operated either automatically or, if necessary, manually.

A further advantageous development of the alignment device according to the invention is that clamping strips, which include the clamping portions, and the hydraulic clamping cylinders are arranged in the alignment device with respect to each other in such a way that the upper plate cannot be lifted off the lower plate when the clamping is released.

This is particularly advantageous because the upper plate of the alignment device can never be lifted off, not even when the clamping is released, and the workpiece cannot fall down due to loose mounting of the upper plate on the lower plate.

Furthermore, such a structure allows for the workpiece to be in its position with respect to the machine table horizontally, even during the adjustment process of the workpiece with respect to the machine table.

An advantageous development of the alignment device according to the invention is that the alignment device further comprises an adjustment tool which can be received by a work spindle of the machine tool and with which the spindles for introducing the mechanical force for displacing the upper plate with respect to the lower plate and the clamping spindle can be actuated at engagement portions thereof.

The provision of an adjustment tool offers the advantage that a fully automated adjustment process of the workpiece with respect to the machine table can be carried out by means of the work spindle of the machine tool, without the operator having to intervene manually in any way.

An advantageous further development of the alignment device according to the invention is that the adjustment tool is further configured to provide axial compensation by means of a resilient element when the adjustment tool is in engagement with one of the spindles of the alignment device.

Thereby, shocks that are caused when the adjustment tool is brought into engagement with one of the spindles of the alignment device can be attenuated/damped.

In addition, the alignment device according to the invention may advantageously be further developed in that the adjustment tool is further configured to set a torque that is to be transmitted from the work spindle to the spindle of the alignment device via the adjustment tool.

In addition, it is advantageous to be able to limit the torque that is to be transmitted from the work spindle of the machine tool to the spindles of the alignment device in order to avoid damage to the spindles or the adjustment and locking mechanisms of the alignment device from possible overload.

The method for aligning a position of a workpiece on a machine table of a numerically controlled machine tool according to the invention comprises the steps of: clamping the workpiece to be machined, receiving a measuring probe in a work spindle of the machine tool, probing the clamped workpiece in order to determine a concentricity offset of the clamped workpiece with respect to the axis of rotation of the machine table of the machine tool, adjusting the workpiece with respect to the axis of rotation of the machine table by means of one of the aforementioned alignment devices comprising the sub-steps of: receiving an adjustment tool in the work spindle, releasing a lock of the upper plate with respect to the lower plate using the adjustment tool, displacing the upper plate with respect to the lower plate of the alignment device by the concentricity offset of the workpiece with respect to the axis of rotation of the machine table determined by the measuring probe, the displacement of the upper plate with respect to the lower plate being carried out by means of the adjustment tool, and locking the adjusted relative position of the upper plate with respect to the lower plate by means of the adjustment tool.

By using the alignment device according to the invention, it was possible to provide a space-saving possibility of compensating for a concentricity offset of a workpiece to be machined with respect to the axis of rotation of a machine table. At the same time, this was possible to omit highly precise clamping devices such as ring clamping or the like. Furthermore, it is extremely advantageous that the alignment device according to the invention can be used for a wide range of components/workpieces and thus acquisition expenses are incurred only once instead of having to use different clamping means for different workpieces. Furthermore, the alignment device according to the invention made it possible to achieve that the alignment process can now be carried out fully automatically without the intervention of an operator, and thus a significantly higher degree of consistency in the machining results could be achieved.

Furthermore, the adjustment of the alignment device by means of the work spindle of the machine tool allows for adjustment results for each workpiece or component to be logged via the NC control, resulting in better traceability of the machining of the workpiece/component and the corresponding quality of the workpiece/component.

Further aspects and advantages thereof, as well as advantages and more specific implementation options for the aspects and features described above, will become apparent from the following descriptions and explanations of the attached figures, which should not be construed as restrictive in any way.

DETAILED DESCRIPTION OF THE FIGURES AND PREFERRED EMBODIMENTS OF THE PRESENT INVENTION

In the following, various examples or embodiments of the present invention are described in detail with reference to the figures. Identical or similar elements may here be denoted by the same reference symbols. In some cases they may be denoted by different reference symbols, however.

It should be emphasized, however, that the present invention is in no way limited or restricted to the exemplary embodiments described below and features thereof, but rather includes further modifications of the exemplary embodiments; in particular those that result from modifications of the features of the examples described or from combining one or more of the features of the examples described are included within the scope of protection of the independent claims.

Figure 1:
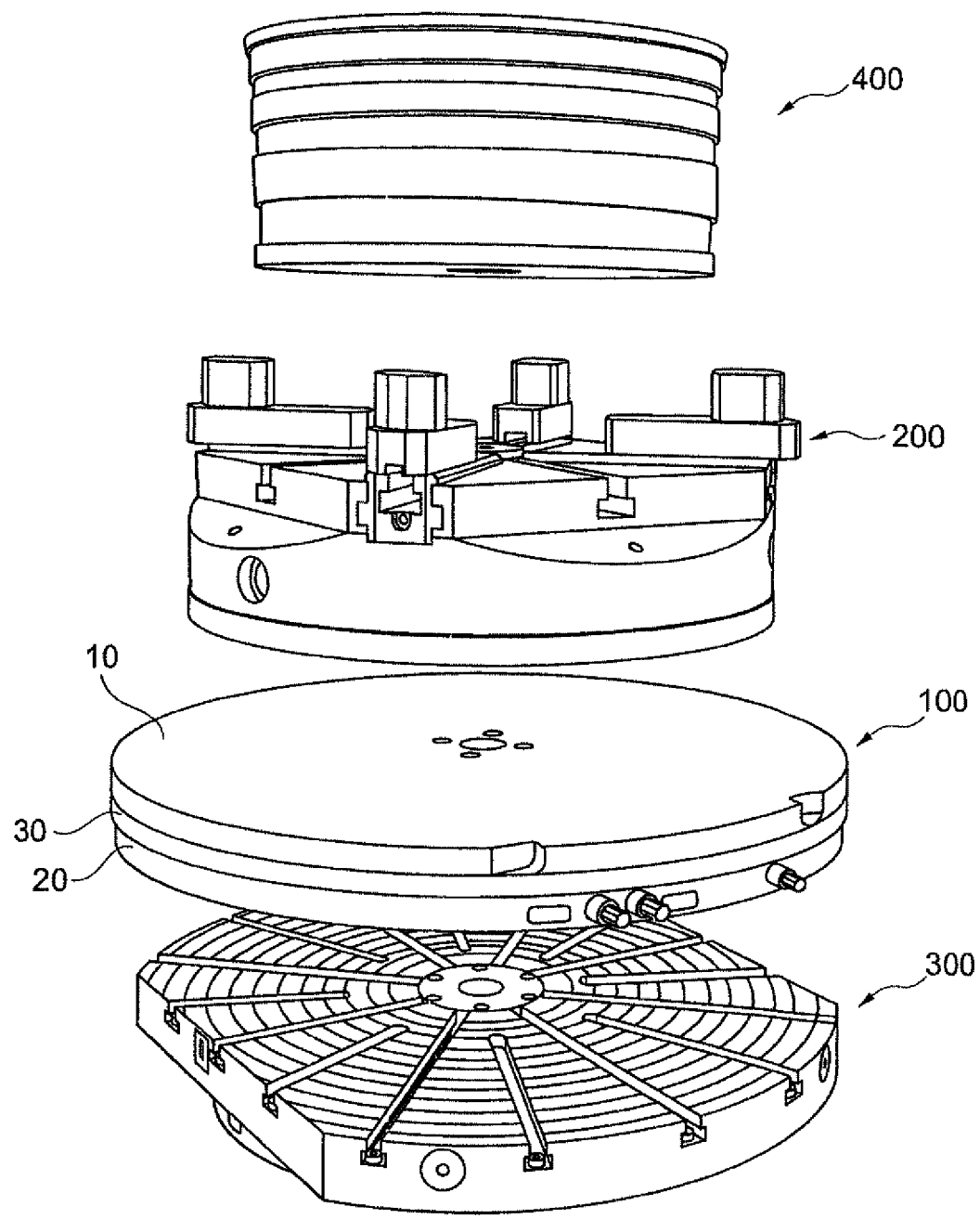
FIG. 1 schematically shows an embodiment of the alignment device according to the invention as well as a machine table, a clamping device and a workpiece to be machined.

FIG. 1 schematically shows an embodiment of the alignment device 100 according to the invention as well as a machine table 300, a clamping device 200 and a workpiece 400 to be machined.

Here, a configuration with the alignment device 100 being used for adjusting the workpiece 400 with respect to the machine table 300 is to be shown.

First, the alignment device 100 is mounted on the machine table 300, this being done via the lower plate 20 of the alignment device 100. Furthermore, the upper plate 10 of the alignment device 100 is configured such that it can receive the clamping device 200 in a substantially centered manner. For this purpose, the upper plate 10 of the alignment device 100, as shown in FIG. 1, may have centering bores or similarly acting means in order to receive the clamping device 200 in a substantially centered manner. The clamping device 200 shown is only to serve as an example and can be replaced by any other clamping device.

The workpiece 400 to be machined can now be firmly clamped in the clamping device 200 and can now be put into a rotational motion by the machine table 300, accordingly.

Furthermore, FIG. 1 shows the layered structure of the alignment device 100 comprising, in addition to the upper plate 10 and the lower plate 20, a seal 30 ensuring a seal between the upper plate 10 and the lower plate 20.

Figure 2:
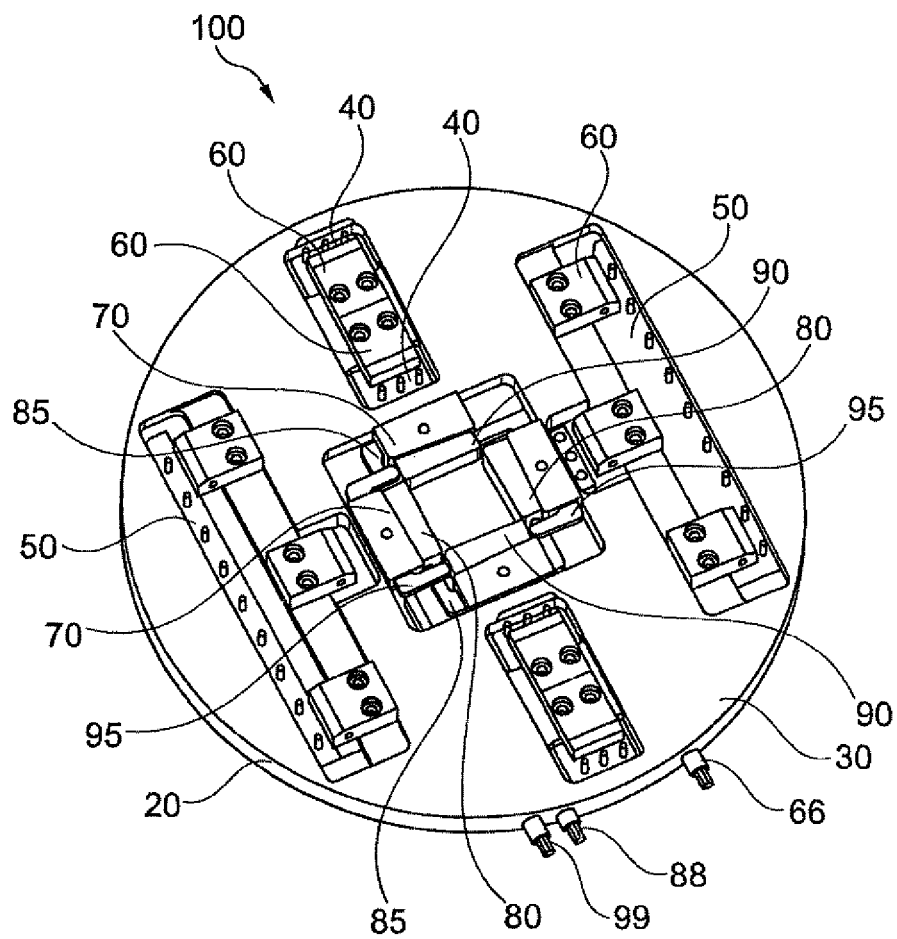
FIG. 2 schematically shows a detailed view of the embodiment of the alignment device according to the invention as well as components of the adjustment mechanism and the locking mechanism.

FIG. 2 schematically shows a detailed view of the embodiment of the alignment device 100 according to the invention and components of the adjustment mechanism and the locking mechanism.

Here, the upper plate 10 of the alignment device 100 has been omitted in this view in order to make the inner components of the alignment device 100 recognizable.

Here, in addition to the lower plate 20 and the seal 30, in particular the adjustment mechanism comprising wedge-shaped elements 80, 90, lever elements 85, 95 and the immovable wedge-shaped elements 70 connected to the lower plate 20 is shown. The adjustment mechanism is explained in detail with reference to FIG. 3a.

In addition, FIG. 2 shows the locking mechanism securing the position of the upper plate 10 with respect to the lower plate 20. Here, the locking mechanism comprises hydraulic clamping cylinders 60 which clamp the clamping portions of the alignment device 100 and thus secure the relative position of the upper plate 10 with respect to the lower plate 20. Here, the clamping portions are formed by clamping strips 40, 50 which may have different lengths and may be oriented differently within the alignment device 100 depending on the application.

At the same time, the alignment device 100 is configured such that the hydraulic clamping cylinders 60 and the lower plate 20 in combination create a type of guide rail for the clamping strips 40, 50, within which the clamping strips 40, 50 and thus the upper plate 10 can move with respect to the lower plate 20 in a plane substantially parallel to a plane of the lower plate 20 which is in contact with the machine table 300. This situation is illustrated in detail in FIG. 4.

Furthermore, FIG. 2 shows that the lower plate 20 has several recesses in which the clamping strips 40, 50, which are firmly connected to the upper plate 10 (e.g. by screw connections), can be accommodated. Furthermore, the recesses in the lower plate 20 are shaped in such a way that the hydraulic clamping cylinders 60 may form the guide rail in combination with the clamping strips 40, 50 of the upper plate 10. This allows the upper plate 10 to be guided with respect to the lower plate 20.

Figure 3A:
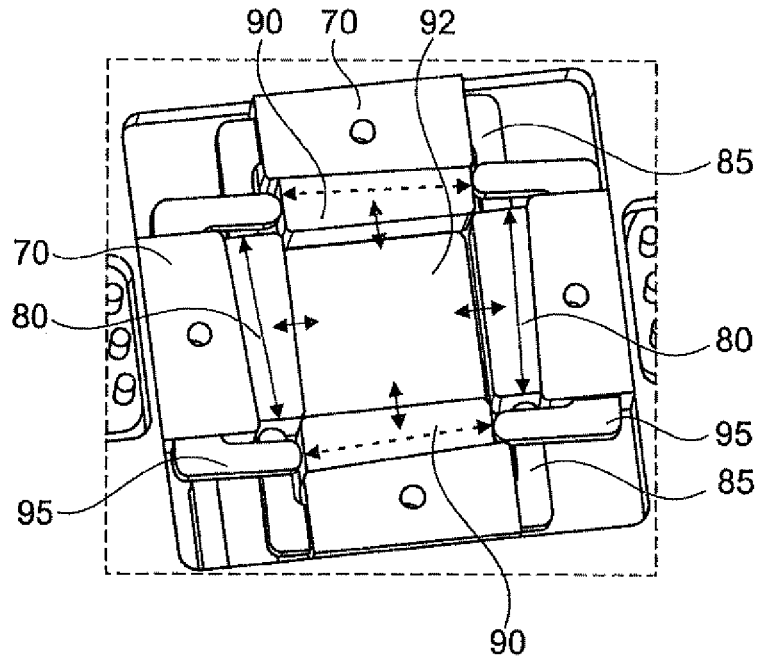
FIG. 3a shows details of an embodiment of the adjustment mechanism of the alignment device according to the invention with wedge-shaped elements.

In addition, a recess, in which the adjustment mechanism explained in detail with reference to FIG. 3a is accommodated in the alignment device 100, is provided substantially centrally in the lower plate 20.

Furthermore, FIG. 2 schematically shows the arrangement of the spindles 66, 88, 99 of the alignment device 100, by means of which the alignment device 100 can be operated.

Particularly, the spindles 88, 99 are used to adjust the relative position of the upper plate 10 with respect to the lower plate 20. The spindles 88, 99 are configured such that they can be operated, outside of the alignment device 100, by a tool by means of a rotary movement/rotation and convert the rotary movement into a translational movement for adjusting the adjustment mechanism.

Similarly, the spindle/clamping spindle 66 can be operated, outside of the alignment device 100, by a tool by means of a rotary movement/rotation, so that the clamping spindle 66 applies or reduces a hydraulic pressure transmitted to the hydraulic clamping cylinders 60 and thus creates or releases the clamping between the upper plate 10 and the lower plate 20.

Here, the clamping spindle 66 may generate a pressure of the hydraulic fluid of up to 500 bar in some cases.

Instead of the mechanically operated spindles 66, 88, 99, servomotors could also be used to operate the adjusting mechanism and/or the locking mechanism, so that the alignment device 100 could be operated/controlled electrically for the most part or even completely.

FIG. 3a shows details of an embodiment of the adjustment mechanism of the alignment device 100 according to the invention with wedge-shaped elements 70, 80, 90.

It is shown in detail how a block 92 (merely indicated here) in the center of the adjustment mechanism firmly connected to the upper plate 10 of the alignment device 100 can be displaced in two directions when the wedge-shaped elements 80, 90 are displaced. This should be indicated by the arrows, the arrows with a continuous line belonging together and the arrows with a dotted line belonging together. Here, the longer arrows represent the displacement of the wedge-shaped elements 80, 90 with respect to the wedge-shaped elements 70 which are immovable with respect to the lower plate 20, the displacement being caused by the adjustment of the spindles 88, 99.

Furthermore, the length differences are intended to clarify that when the wedge-shaped elements 80, 90 are displaced in the direction of the longer arrows, this causes a displacement of the block firmly connected to the upper plate 10, the displacement being dependent on the wedge angle of the wedge-shaped elements 70, 80, 90.

If, for example, the spindle 88 is adjusted by a rotary movement by means of a tool, the wedge-shaped elements 80 are displaced. Here, the structure shown is advantageous since the spindle 88 needs to initiate the movement at only one of the wedge-shaped elements 80 since the wedge-shaped elements 80 are coupled to one another by means of the lever elements 85 in such a way that the displacement movement of the one wedge-shaped element 80 is transmitted directly to the second wedge-shaped element 80. This coupling, by means of which the lever elements 85 are "clamped" with one another via the wedge-shaped elements 80 in a manner free of play, ensures an immediate introduction of force and a direct transmission of motion resulting therefrom.

For this purpose, the lever elements 85 are U-shaped and are connected substantially centrally at an intermediate member thereof to the wedge-shaped elements 70 by a rotatable mounting, which is clarified by the bore on the wedge-shaped elements 70. It should be pointed out again at this point that the wedge-shaped elements 70 are immobile/immovable with respect to the lower plate 20.

Since the structure and interaction of the wedge-shaped elements 90, 70, the lever elements 95 and the spindle 99 is substantially the same as the above-mentioned interaction of the wedge-shaped elements 80, 70, the lever elements 85 and the spindle 88, only the direction of action for displacing the block and the upper plate 10 differs, a repeated description of the adjustment mechanism for the second direction is omitted.

A considerable advantage of the structure of the adjustment mechanism with the paired wedge-shaped elements 80, 70 and 90, 70 is that the block 92 (merely indicated in FIG. 3*a*), which is firmly connected to the upper plate 10 and is always in contact with the corresponding wedge-shaped elements 80, 90 at the sides, is supported in a manner free of play between the pairs of wedge-shaped elements 80, 70 and the pairs of wedge-shaped elements 90, 70 not only before, but also during and after the adjustment/setting. This allows for extremely precise adjustment of the workpiece 400 with respect to the machine table 300.

Figure 3B:
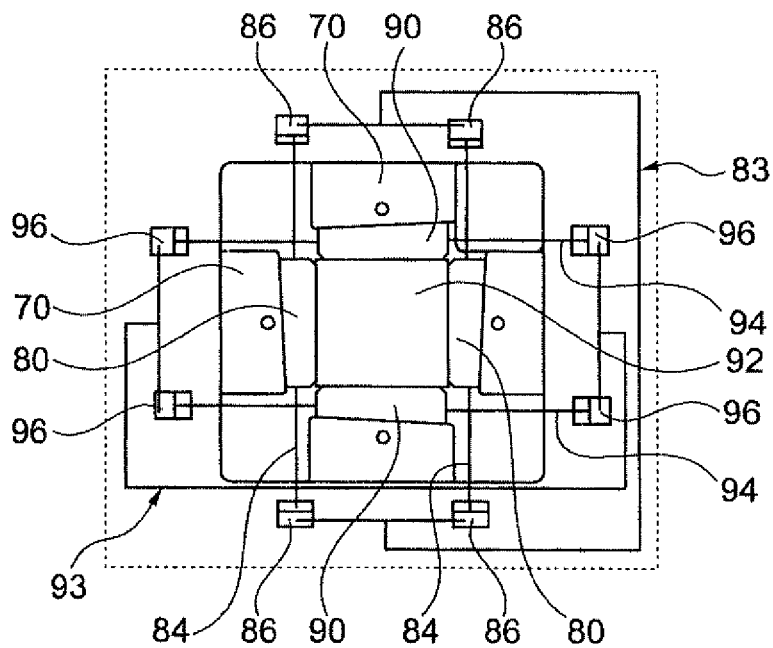
FIG. 3b shows a further embodiment of the adjustment mechanism of the alignment device according to the invention with hydraulically coupled wedge-shaped elements.

Here, it should be pointed out that, in addition to the structure of the adjusting mechanism, as shown in FIG. 3*a*, the spindles 88, 99 may also be provided with a similarly acting adjustment mechanism, e.g. a hydraulically operated coupling or the like (see FIG. 3*b*).

FIG. 3*b* shows another embodiment of the adjustment mechanism of the alignment device 100 according to the invention with hydraulically coupled wedge-shaped elements 80, 90.

Here, instead of the lever elements 85, 95, four hydraulic cylinders 86, 96 (coupled in a respective circuit 83, 93) can ensure an adjustment of the upper plate 10 by the hydraulic cylinders 86, 96 coupled via the respective hydraulic circuit 83, 93 pressing the wedge-shaped elements 80, 90 against the wedge-shaped elements 70. Since this can also be maintained in the adjusted state, a (biased) contact between the wedge-shaped elements 80, 90, the wedge-shaped elements 70 and the block 92 is always ensured.

A closed oil circuit 83, 93 for each adjustment direction of the upper plate 10 ensures the biased contact and a play-free transmission of the displacement movement between the individual wedge-shaped elements 80 or between the individual wedge-shaped elements 90. Furthermore, piston rods 84, 94 of the respective hydraulic cylinders 86, 96 are pressed against the wedge-shaped elements 80, 90 by the common closed oil circuit 83, 93 such that no mechanical play can occur at the interface between the piston rod 84, 94 and the wedge-shaped element 80, 90.

The wedge-shaped elements 80, 90 may in turn be adjusted using the spindles 88, 99 and the adjustment tool 110.

Figure 4:
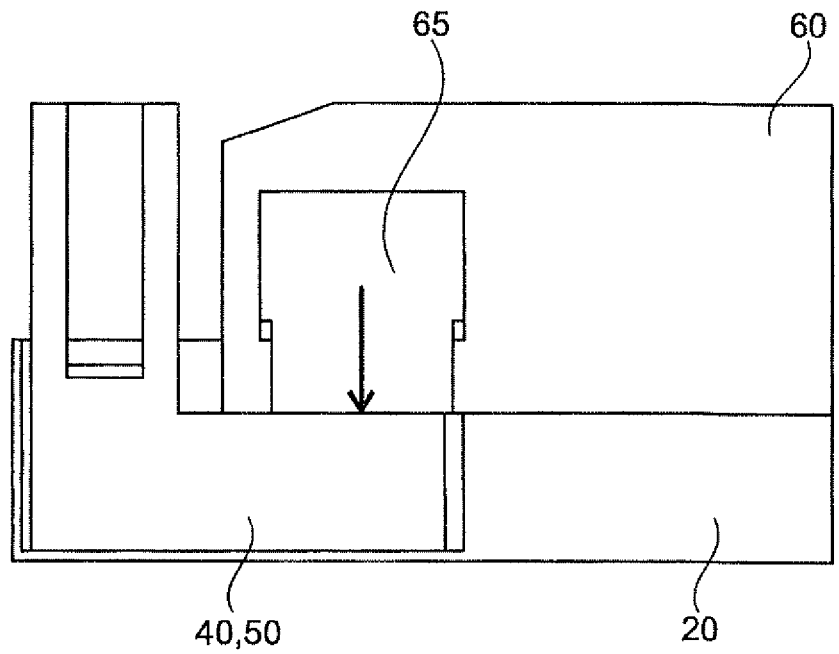
FIG. 4 shows a cross section of an embodiment of the locking mechanism of the alignment device according to the invention.

FIG. 4 shows a cross section of an embodiment of the locking mechanism of the alignment device 100 according to the invention.

In particular, it is shown here how the hydraulic clamping cylinder 60 in combination with the lower plate 20 creates a guide within which a clamping strip 40, 50 is guided. For this purpose, recesses/depressions, in which the clamping strip 40, 50 is arranged, are provided in the lower plate 20. If, as shown in FIG. 4, a hydraulic clamping cylinder 60 is now mounted on the lower plate 20 from above, the clamping strip 40, 50 is secured in the recess of the lower plate 20 against removal/lifting. This is particularly advantageous because, when the clamping is released, the upper plate 10, which is firmly connected to the clamping strips 40, 50, cannot be released from the lower plate 20. This is not only advantageous with regard to the broadest possible field of application for the alignment device 100 (the workpiece 400 may assume various positions, horizontal or vertical, with respect to the machine table 300), but also in particular with regard to safety-related aspects or functional reliability of the alignment device 100.

In addition, FIG. 4 shows that each hydraulic clamping cylinder 60 includes one or more hydraulic clamping pistons 65, which can be moved out of the hydraulic clamping cylinder 60 by means of the hydraulic pressure applied by the clamping spindle 66, and thus generates the clamping between the lower plate 20 and clamping strips 40, 50 connected to the upper plate 10 (not shown here).

Figure 5:
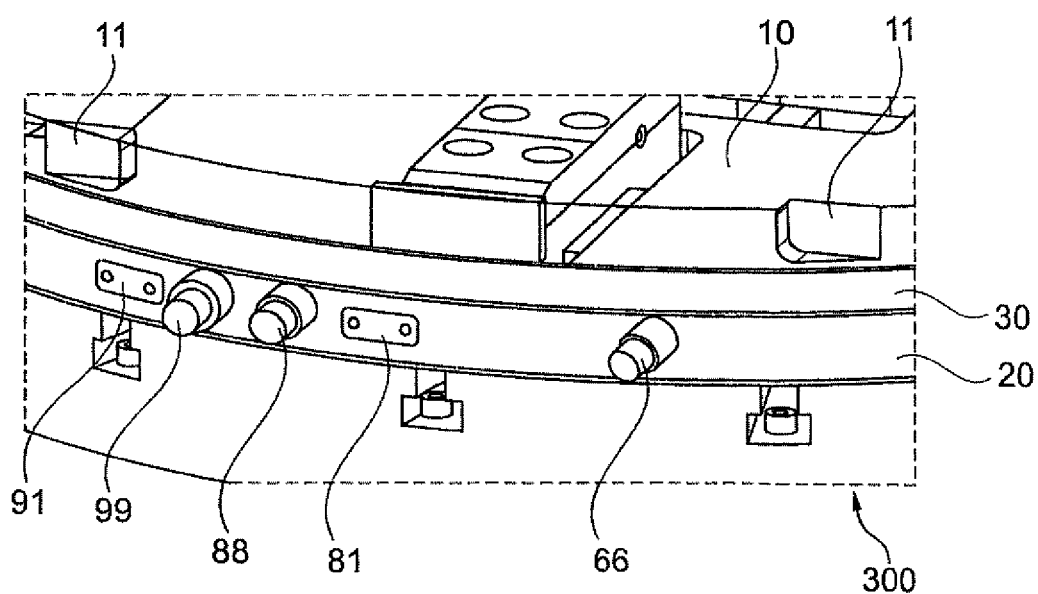
FIG. 5 shows the embodiment of the alignment device according to the invention with the engagement portions of the two spindles for adjusting the workpiece to be machined with respect to the machine table and the engagement portion of the clamping spindle.

FIG. 5 shows the embodiment of the alignment device 100 according to the invention with the engagement portions of the two spindles 88, 99 for adjusting the workpiece 400 to be machined with respect to the machine table 300 and the engagement portion of the clamping spindle 66.

As shown, it can be advantageous, for example, when the upper plate 10 has recesses 11, by means of which a measuring probe (not shown here) can determine the position of the upper plate 10 with respect to the machine table 300 or another reference object in order to thereby check the adjustment of the workpiece 400 with respect to the machine table 300 carried out by means of the spindles 88, 99. If it can be determined here that the concentricity offset of the workpiece 400 with respect to the machine table 300 has substantially been eliminated, the relative position of the upper plate 10 with respect to the lower plate 20 can be fixed again by means of the clamping spindle 66.

The recesses 11 could, however, also configured such (e.g., by means of suitable reflectors) that an optical measuring system, for example a laser interferometer or the like, monitors the relative position of the upper plate 10 with respect to the lower plate 20 during the adjustment by means of the spindles 88, 99.

Furthermore, FIG. 5 shows, by way of example, that the alignment device 100 could also have digital displacement measurement indicators 81, 91 by means of which an operator of the machine tool 1000 (not shown here; see FIG. 8) can understand and also visually check by how many micrometers/millimeters the relative position of the upper plate 10 with respect to the lower plate 20 was changed. However, an analog displacement measuring system or analog displacement measuring indicators would also be conceivable instead of the digital displacement measuring indicators 81, 91. In addition, the indicators, in particular the digital displacement measurement indicators, could also be arranged outside the machining area of the machine tool 1000 so that the operator can read them more easily.

Figure 6:
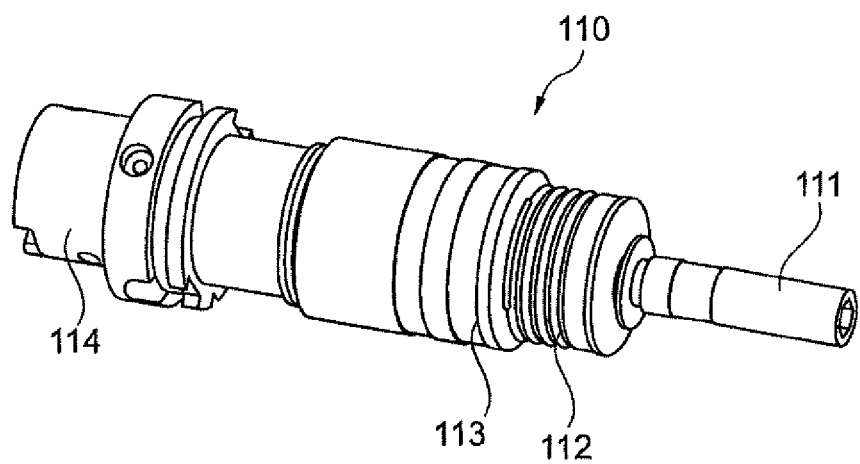
FIG. 6 shows an embodiment of an adjustment tool of the alignment device according to the invention, which can be brought into engagement with the engagement sections of the spindles of the alignment device according to the invention.

FIG. 6 shows an embodiment of an adjustment tool 110 of the alignment device 100 according to the invention, which can be brought into engagement with the engagement portions of the spindles 66, 88, 99 of the alignment device 100 according to the invention.

Figure 8:
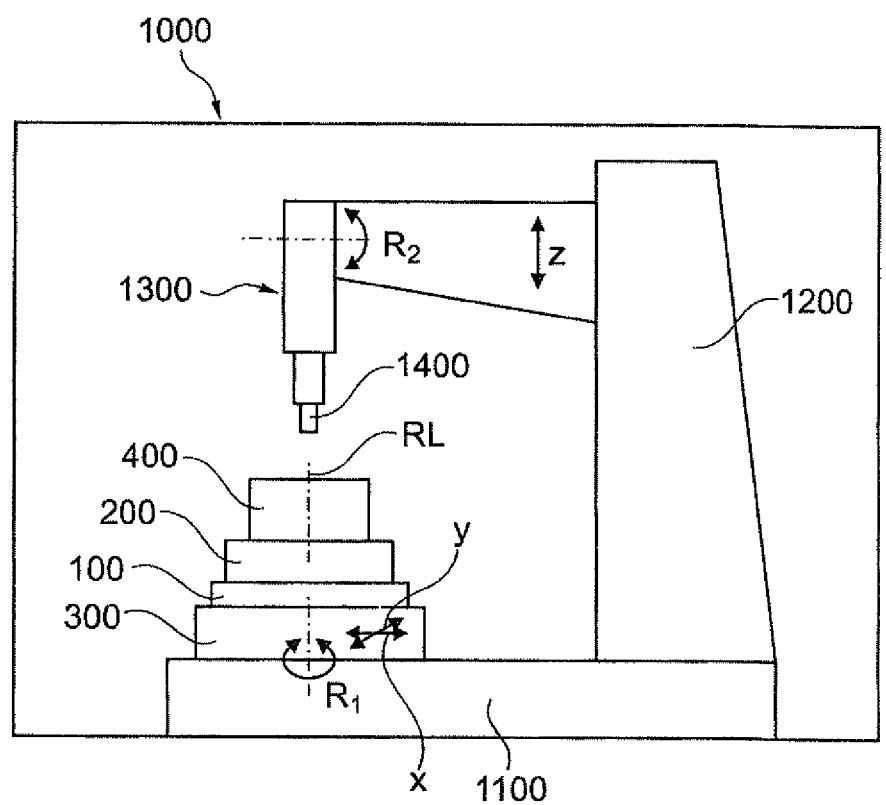
FIG. 8 schematically shows a machine tool in which the alignment device according to the invention can be used.

The adjustment tool 110 is advantageously configured such that it can be received by a work spindle 1300 (not shown here, see FIG. 8). For this purpose, the adjustment tool 110 has a corresponding receiving portion 114 which can be configured, for example, as a standardized hollow shank taper. However, all other known receiving systems (e.g., steep taper) may also be used as the receiving portion 114, depending on which system the work spindle 1300 has.

In addition, the adjustment tool 110 includes a tool attachment 111 which can be brought into engagement with the engagement portion of the spindles 66, 88, 99. Here, the shape of the engagement portions of the spindles 66, 88, 99 and, in a corresponding manner, of the tool attachment 111 may be embodied, for example, between a simple square and a very specifically structured polygon/multi-key. Other shapes, possibly also standardized plug connections such as a hexalobular socket ("Torx") are also conceivable.

In addition, the adjustment tool 110 may have a portion 112 for axial compensation. This is particularly advantageous when the adjustment tool 110 is brought into engagement with the engagement portions of the spindles 66, 88, 99 with the aid of the work spindle 1300 and shocks that inevitably occur are attenuated in order to avoid damage to the alignment device 100, the adjustment tool 110 or even the work spindle 1300. A resilient and/or damping element for the portion 112 may be advantageous here.

Furthermore, the adjustment tool 110 advantageously has a torque limiting portion 113, by means of which the torque from the work spindle 1300 that is to be transmitted to the spindles 66, 88, 99 can be limited. Thereby, damage to the spindles 66, 88, 99 due to excessive torque can be excluded. Limiting the torque for the adjustment and/or locking mechanism may also be advantageous for avoiding damage to the corresponding mechanisms.

Figure 7:
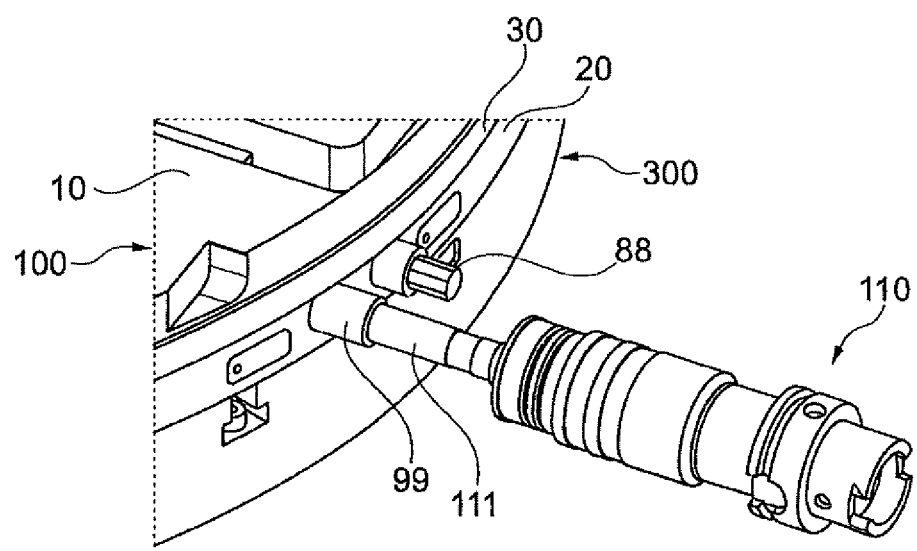
FIG. 7 shows the adjustment tool in engagement with one of the spindles of the embodiment of the alignment device according to the invention.

FIG. 7 shows the adjustment tool 110 in engagement with one of the spindles 88, 99 of the embodiment of the alignment device 100 according to the invention.

This serves to show how the adjustment tool 110 is brought close to the alignment device 100 and into engagement with one of the spindles 88, 99 (here Spindle 99). By applying a torque through the work spindle 1300 of the machine tool 1000 (both not shown here; see FIG. 8), the spindle 99 of the alignment device 100 can be adjusted and thus the workpiece 400 which is connected to the upper plate 10 of the alignment device 100 by the clamping device 200 can be adjusted with respect to the machine table 300 in order to eliminate a possibly existing concentricity offset of the workpiece 400.

FIG. 8 schematically shows a machine tool 1000 in which the alignment device 100 according to the invention can be used.

The machine tool 1000 shown is a milling/turning machine, i.e., a combination of a milling machine tool and a turning machine. In this case, the structure of a machine tool for milling is substantially retained and the machine table 300 is provided with a function of a turning spindle of a turning machine.

The machine tool 1000 shown has, in addition to a machine bed 1100, a machine stand 1200, the work spindle 1300 and a machining tool 1400 received by the work spindle 1300, the structure of the machine table 300, the alignment device 100, the clamping device 200 and the workpiece 400 shown in FIG. 1.

For example, the machine table 300 has, in addition to translational axes in the X and Y directions, an axis of rotation $R_1$ about which the machine table 300 rotates and thus drives the workpiece 400 to be machined in a rotary manner for machining with the machining tool 1400.

Furthermore, by way of example, a rotary axis RL of the workpiece 400 to be machined is shown, about which the workpiece 400 to be machined should ideally rotate by being driven by the machine table 300. However, this can only be the case if the axis of rotation $R_1$ of the machine table 300 and the rotary axis RL of the workpiece 400 are coaxial with one another.

For substantially achieving this, the alignment device 100 is provided between the machine table 300 and the workpiece 400. Thereby, an offset between the rotary axis RL of the workpiece 400 and the axis of rotation $R_1$ of the machine table 300 can be eliminated by adjustment and the workpiece 400 can be driven to rotate substantially about the rotary axis RL thereof for machining.

In addition to the already mentioned translatory axes in the X and Y directions, the machine tool may also have a translatory axis in the Z direction, for example on the tool stand 1200. Furthermore, the work spindle 1300 may also be mounted so as to be rotatable with respect to the machine stand about a pivot axis $R_2$ arranged perpendicularly to the main drive axis of the work spindle 1300.

The mentioned distribution of the translational axes (X, Y, Z) and the pivot axis $R_2$ is merely intended to be exemplary and should not be interpreted as restrictive. The machine tool 1000 may also have further feed axes; for example, the machine table 300 could have an additional pivot axis.

Figure 9:
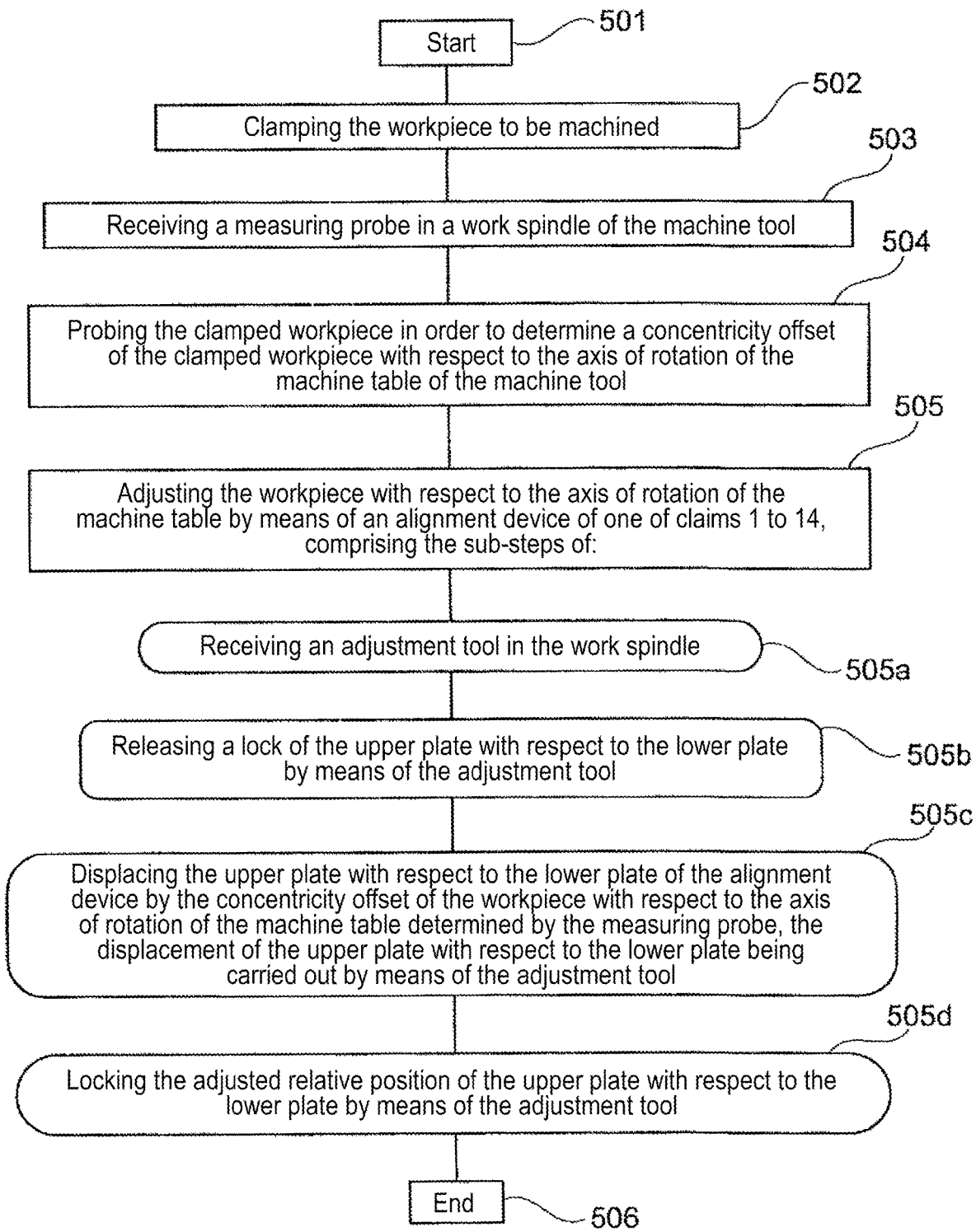
FIG. 9 shows a flow chart of an exemplary embodiment of the method for aligning a position of a workpiece on a machine table of a numerically controlled machine tool according to the invention.

FIG. 9 shows a flow diagram of an exemplary embodiment of the method for aligning a position of a workpiece 400 on a machine table 300 of a numerically controlled machine tool 1000 according to the invention.

The method comprises the following steps.

At the start, in step S02, the workpiece 400 that is to be machined is clamped. The workpiece 400 is fixed with respect to the machine table 300 by the clamping device 200 and is already roughly pre-centered (rotary axis RL of the workpiece 400 and axis of rotation $R_1$ of the machine table 300 are coaxial to a few tenths of a millimeter).

In the next step S03, a measuring probe (or a similar or a different type of measuring device) is received in the work spindle 1300 of the machine tool 1000. This allows for the current relative position of the workpiece 400 with respect to the machine table 300 to be detected. It should be pointed out here that, in addition to tactile measuring devices, optical measuring devices, e.g. based on laser interferometers, may be used.

In step S04, the clamped workpiece 400 is probed in order to determine a possible concentricity offset (rotary axis RL) of the clamped workpiece 400 from the axis of rotation $R_1$ of the machine table 300 of the machine tool 1000.

Various procedures may be used to determine the offset, depending on the nature of the workpiece 400 and/or the desired accuracy of the coaxial alignment of the rotary axis RL of the workpiece 400 with respect to the axis of rotation $R_1$ of the machine table 300.

In the following step S05, the workpiece 400 is adjusted with respect to the axis of rotation $R_1$ of the machine table 300 by means of the alignment device 100. Now, the following sub-steps are carried out for the adjustment:

In step S05a, the adjustment tool 110 is received in the work spindle 1300 of the machine tool 1000 in order to operate the spindles 66, 88, 99 of the alignment device 100.

In the subsequent sub-step S05b, the lock of the upper plate 10 with respect to the lower plate 20 is released by means of the adjustment tool 110 by operating the clamping spindle 66 is with the adjustment tool 110 in such a way that the hydraulic pressure in the pressure cylinders 60 is reduced and thereby the clamping effect between the hydraulic clamping piston 65, the clamping strips 40, 50, and the lower plate 20 is removed.

Now, in sub-step S05c, the upper plate 10 is displaced with respect to the lower plate 20 of the alignment device 100 in order to largely eliminate the concentricity offset (rotary axis RL) of the workpiece 400 with respect to the axis of rotation $R_1$ of the machine table 300, as determined by the measuring probe.

Here, the upper plate 10 is displaced with respect to the lower plate 20 by means of the adjustment tool 110, as the work spindle 1300 brings the adjusting tool 110 into engagement with one or both spindles 88, 99 of the alignment device 100 one after the other and accordingly performs an adjustment of these spindles 88, 99 such that the relative position of the upper plate 10 with respect to the lower plate 20 is changed by means of the adjustment mechanism to eliminate the offset.

Then, in step S05d, the adjusted relative position of the upper plate 10 with respect to the lower plate 20 is locked by means of the adjustment tool 110, as the work spindle 1300 brings the adjustment tool 110 back into engagement with the clamping spindle 66 of the alignment device 100 and adjusts it in such a way that the hydraulic pressure in the hydraulic clamping blocks 60 is significantly increased again, which in turn results in a clamping effect between the hydraulic clamping piston 65, the clamping strips 40, 50 and the lower plate 20.

As a result, the now adjusted relative position of the workpiece 400 with respect to the machine table 300 can be secured and the workpiece 400 can be machined with the machining tool 1400.

Examples and exemplary embodiments of the present invention and advantages thereof have been described in detail above with reference to the accompanying figures.

It should be emphasized again that the present invention is in no way limited or restricted by the exemplary embodiments described above and features thereof, but rather further comprises modifications of the exemplary embodiments; in particular those that result from modifications of the features of the examples described or from combinations of one or more of the features of the examples described are included within the scope of protection of the independent claims.

LIST OF REFERENCE SYMBOLS

10 Upper plate
20 Lower plate
30 Seal between the upper and lower plates
40 Clamping strip short
50 Clamping strip long
60 Hydraulic clamping cylinder
65 Hydraulic clamping piston
66 Clamping spindle
70 Wedge-shaped element, immovable with respect to the lower plate 20,
80 Wedge-shaped element
81 Digital displacement measurement indicator
83 Closed hydraulic circuit (oil circuit)
84 Piston rod
85 Lever element
86 Hydraulic cylinder
88 Spindle for adjustment
90 Wedge-shaped element
91 Digital displacement measurement indicator
92 Block
93 Closed hydraulic circuit (oil circuit)
94 Piston rod
95 Lever element
96 Hydraulic cylinder
99 Spindle for adjustment
100 Alignment device
110 Adjustment tool
111 Tool attachment
112 Portion for axial compensation
113 Torque limiting portion
114 Receiving portion
200 Clamping device
300 Machine table
400 Workpiece
1000 Machine tool
1100 Machine bed
1200 Machine stand
1300 Work spindle
1400 Machining tool

The invention claimed is:

1. An alignment device (100) for adjusting a workpiece on a machine table (300) of a numerically controlled machine tool (1000), said device comprising:
   a lower plate (20), which defines a center, mountable on said machine table (300) of said machine tool (1000),
   an upper plate (10) movably arranged on said lower plate (20), on the upper side of which a workpiece carrier is mountable,
   an adjustment mechanism formed between said lower plate (20) and said upper plate (10) and including
      a first pair of wedge-shaped elements (70, 80) located on first opposite sides of the center of said lower plate (20) and which, in response to the application of a mechanical force thereto, are displaced with respect to one another, and
      a second pair of wedge-shaped elements (70, 90) located on second opposite sides of the center of said lower plate (20) and which, in response to the application of a mechanical force thereto, are displaced with respect to one another,
   wherein displacement of the wedge-shaped elements (70, 80, 90) displaces said upper plate (10) with respect to said lower plate (20) and in parallel to a plane of said machine table (300) on which said lower plate (20) is mounted, wherein the upper plate (10) is displaceable in two mutually perpendicular directions with respect to said lower plate (20), and
   a locking mechanism for securing the relative position of said upper plate (10) with respect to said lower plate (20).

2. The alignment device (100) according to claim 1, wherein
   said adjustment mechanism is further configured such that one wedge-shaped element (70, 80, 90) of each pair is displaceable with respect to the other wedge-shaped element (70, 80, 90) of the respective pair, wherein the displaceable wedge-shaped elements (70, 80, 90)

jointly causing the displacement of said upper plate (10) in a direction are coupled to one another with a lever mechanism (95).

3. The alignment device (100) according to claim 2, wherein
said lever mechanism is configured such that the displaceable wedge-shaped elements (70, 80, 90) jointly causing the displacement of said upper plate (10) in a direction have at their respective ends in the displacement direction thereof a common lever element (95), which is rotatably mounted in one of the pairs of wedge-shaped elements (70, 80, 90) causing the displacement of said upper plate (10) in the direction perpendicular thereto, whereby a displacement movement of the one displaceable wedge-shaped element (70, 80, 90) can be transmitted to the other displaceable wedge-shaped element (70, 80, 90) for the displacement of said upper plate (10) in a direction.

4. The alignment device (100) according to claim 3, wherein
the interaction of the lever elements (95) with the corresponding displaceable wedge-shaped elements (70, 80, 90), which cause a displacement of said upper plate (10) in a direction, can be set in a manner free of play with an adjustment device.

5. The alignment device (100) according to claim 1, wherein
said locking mechanism further comprises:
hydraulic clamping cylinders (60) which clamp the clamping portions of said alignment device (100) and thereby secure a relative position between said upper plate (10) and said lower plate (20) with clamping.

6. The alignment device (100) according to claim 5, wherein
said alignment device (100) further comprises:
a clamping spindle (66), with which a hydraulic pressure in said hydraulic clamping cylinders (60) of said locking mechanism can be generated for securing the relative position of said upper plate (10) with respect to said lower plate (20),
wherein said clamping spindle (66) includes, on the side opposite the generation of the hydraulic pressure, an engagement portion at which the hydraulic pressure can be generated by rotating said engagement portion.

7. The alignment device (100) according to claim 5, wherein
clamping strips (40, 50), which include the clamping portions, and said hydraulic clamping cylinders (60) are arranged in said alignment device (100) with respect to each other in such a way that said upper plate (10) cannot be lifted off said lower plate (20) when the clamping is released.

8. The alignment device (100) according to claim 7, wherein
said alignment device (100) further comprises two spindles (88, 99) and an adjustment tool (110) configured to be received by a work spindle (1300) of said machine tool (1000), to engage said spindles (88, 89) and to engage said clamping spindle (66).

9. The alignment device (100) according to claim 1, wherein
the alignment device (100) further comprises:
two spindles (88, 99) for introducing a mechanical force for displacing said upper plate (10) with respect to said lower plate (20), wherein a first spindle (88, 99) of said two spindles (88, 99) is provided for a first displacement direction of said upper plate (10) and a second spindle (99, 88) of said two spindles (88, 99) is provided for a second displacement direction perpendicular to said first displacement direction.

10. The alignment device (100) according to claim 9, wherein
each of said two spindles (88, 99) includes, on the side opposite the wedge-shaped elements (70, 80, 90), an engagement portion at which the displacement of said upper plate (10) with respect to said lower plate (20) can be effected by rotating said engagement portion.

\* \* \* \* \*